(12) United States Patent
Schnitzler (10) Patent No.: US 8,668,826 B2
(45) Date of Patent: Mar. 11, 2014

(54) CONTAINER, AND DEVICE AND METHOD FOR PRODUCING A DISINFECTING SOLUTION

(75) Inventor: Simon Schnitzler, Bibertal (DE)

(73) Assignee: Siemens Aktiengesellschaft, Munich (DE)

( * ) Notice: Subject to any disclaimer, the term of this patent is extended or adjusted under 35 U.S.C. 154(b) by 704 days.

(21) Appl. No.: 12/918,361

(22) PCT Filed: Feb. 19, 2009

(86) PCT No.: PCT/EP2009/051973
§ 371 (c)(1),
(2), (4) Date: Aug. 19, 2010

(87) PCT Pub. No.: WO2009/106476
PCT Pub. Date: Sep. 3, 2009

(65) Prior Publication Data
US 2010/0320157 A1    Dec. 23, 2010

(30) Foreign Application Priority Data
Feb. 27, 2008    (DE) .......................... 10 2008 011 276

(51) Int. Cl.
*C02F 1/76*    (2006.01)
*B01D 27/00*    (2006.01)

(52) U.S. Cl.
USPC ............ 210/206; 137/268; 422/266; 422/279

(58) Field of Classification Search
USPC .................. 210/167.11, 167.3, 206; 137/268; 422/263, 264, 266, 278, 279, 283
See application file for complete search history.

(56) References Cited

U.S. PATENT DOCUMENTS

| | | | |
|---|---|---|---|
| 3,607,103 A | 9/1971 | Kiefer | 23/267 |
| 3,864,090 A * | 2/1975 | Richards | 422/269 |
| 4,192,763 A * | 3/1980 | Buchan | 252/187.3 |
| 4,842,729 A | 6/1989 | Buchan | 210/198.1 |
| 5,251,656 A | 10/1993 | Sexton, Sr. | 137/1 |
| 5,447,641 A | 9/1995 | Wittig | 210/756 |
| 5,637,230 A | 6/1997 | Billings | 210/739 |

(Continued)

FOREIGN PATENT DOCUMENTS

| | | | |
|---|---|---|---|
| DE | 3538644 | 1/1987 | G01F 11/00 |
| DE | 19507329 | 9/1996 | G01F 11/00 |

(Continued)

OTHER PUBLICATIONS

German Office Action for Application No. 10 2008 011 276.3 (8 pages), Jan. 13, 2009.

(Continued)

*Primary Examiner* — Lucas Stelling
(74) *Attorney, Agent, or Firm* — King & Spalding L.L.P.

(57) ABSTRACT

A container (14) with a content (8) has at least one hypochlorite compound, in particular a calcium hypochlorite compound, for generating an aqueous solution, and at least one inlet attachment (46) for attachment to a water supply line (48) and at least one outlet attachment (50) for attachment to an outlet line (52, 92) for a liquid composed of the incoming water and of the content (8), wherein the content (8) is located in accordance with the flow between the inlet attachment (46) and the outlet attachment (50), and the container (14) is designed as a transportable exchange unit that is sealed off from the outside in the unattached state.

19 Claims, 4 Drawing Sheets

(56) References Cited

U.S. PATENT DOCUMENTS

| | | | |
|---|---|---|---|
| 6,298,871 B1 | 10/2001 | Pickens et al. | 137/268 |
| 6,340,431 B2 * | 1/2002 | Khan | 210/85 |
| 6,872,303 B2 * | 3/2005 | Knapp et al. | 210/206 |
| 2006/0186052 A1 | 8/2006 | Seidel et al. | 210/688 |

FOREIGN PATENT DOCUMENTS

| | | | |
|---|---|---|---|
| DE | 10327111 | 12/2004 | C02F 1/42 |
| EP | 0492627 | 7/1992 | B01D 27/00 |
| EP | 1136110 | 9/2001 | B01D 27/10 |
| EP | 1576997 | 9/2005 | B01D 35/02 |
| WO | 9935078 | 7/1999 | B67D 5/00 |

OTHER PUBLICATIONS

International Search Report and Written Opinion for Application No. PCT/EP2009/051973 (19 pages), May 20, 2009.

\* cited by examiner

CONTAINER, AND DEVICE AND METHOD FOR PRODUCING A DISINFECTING SOLUTION

CROSS-REFERENCE TO RELATED APPLICATIONS

This application is a U.S. National Stage Application of International Application No. PCT/EP2009/051973 filed Feb. 19, 2009, which designates the United States of America, and claims priority to DE Application No. 10 2008 011 276.3 filed Feb. 27, 2008. The contents of which are hereby incorporated by reference in their entirety.

TECHNICAL FIELD

The invention relates to a container containing a hypochlorite compound, in particular calcium hypochlorite. In addition, the invention relates to a device for generating a chlorine-containing aqueous disinfectant solution having such a container, and also to a method for generating a disinfectant solution and treating an aqueous system.

BACKGROUND

Metering devices for metering hypochlorite compounds, in particular in the form of calcium hypochlorite, are used for a multiplicity of disinfecting tasks in aqueous systems, for example in drinking water treatment, the treatment of swimming and bathing pool water, the disinfection of process and service water in industry and CIP applications (cleaning-in-place applications), such as, for example, the cleaning of plants in the food and drinks industry or of ultrafiltration systems (UF systems).

Since calcium hypochlorite is a solid which is generally present as dry granules, it is generally known to dissolve the calcium hypochlorite before use in a dissolution container (dissolution container method). In this case the dissolution container is manually charged with calcium hypochlorite granules and exposed to a dissolving water stream. The calcium hypochlorite from the calcium hypochlorite charge passes in part into solution in such a manner that the dissolution container is filled to a defined liquid level with calcium hypochlorite solution. Via an inoculation apparatus, the calcium hypochlorite solution is then withdrawn from the dissolution container and introduced into the water stream that is to be disinfected.

A disadvantage with this solution is that when the dissolution container is manually charged with calcium hypochlorite, a calcium hypochlorite dust emission which is hazardous to health can occur. It must therefore be charged using suitable workers' protective equipment (breathing protection etc). In addition, when the dissolution container is being charged with water or is being refilled with calcium hypochlorite granules, sediment from the bottom of the dissolution container can be swirled up, and this can impair the functioning of fittings downstream of the inoculation water apparatus. Metering pumps, injectors and inoculation water fittings must therefore be cleaned regularly manually. In addition, it is disadvantageous that the resultant dissolution residues at the bottom of the dissolution container form a calcium hypochlorite bed mixed with dissolution residues, which bed remains in the dissolution container. The mixed bed prevents determination of the filling level of the calcium hypochlorite stock present and must be washed away, usually into the sewer system, at regular intervals. Since the contents of the dissolution container, consisting of still undissolved calcium hypochlorite and the prepared solution, are disposed of completely in this case, relatively large amounts of chlorine can pass into the sewer system.

For automating charging with calcium hypochlorite, DE 195 07 329 A1 discloses a device for metering calcium hypochlorite, in which the calcium hypochlorite granules are transported from a storage appliance into the dissolution container by means of a pneumatic conveyor. Particulate residues are dissolved in this solution by adding hydrochloric acid (mixing method). This prevents the functioning of the metering appliances arranged downstream of the calcium hypochlorite dissolution container from being adversely affected by particulate residues, but by adding hydrochloric acid, the chloride loading in the water stream that is to be disinfected is increased extremely. The addition of acid to the calcium hypochlorite solution can therefore lead to release of chlorine gas from the dissolution appliance. In addition, in the case of such pneumatic conveyors, in particular in the event of damage to the filters, calcium hypochlorite dust which is a health hazard can likewise escape. Such semiautomatic charging systems having dry conveyors are, in addition, complex in terms of fabrication and are susceptible to faults owing to the risk of blockage of the conveyor.

In addition, U.S. Pat. No. 4,842,729 discloses a water treatment system in which a receiver is provided for a basket having water treatment tablets branching off in the manner of a T piece from the side of the water line conducting the water that is to be treated. By means of a lid which can be screwed onto the basket receiver, the basket can be lowered into the water line pretensioned against a spring, or exchanged after opening the lid. On exchange of the basket, however, the operator is again exposed to the water treatment tablet components that are hazardous to health.

U.S. Pat. No. 5,447,641 discloses a chlorine addition unit for treating poultry drinking water. The unit possesses a housing in which calcium hypochlorite is arranged in solid form and is dissolved in water. The housing is closed on its open side with a removable lid. In order to recharge the housing with calcium hypochlorite tablets, the lid is opened and the tablets are charged by the operator, in which case the operator comes into contact with the calcium hypochlorite.

U.S. Pat. No. 6,298,871 B1 discloses a feeder unit for, in particular, calcium hypochlorite, which feeder unit comprises a canister for receiving calcium hypochlorite tablets. The canister is introduced into a container and this container is closed by means of a screw closure. In order to refill the container with calcium hypochlorite tablets, the screw closure is opened and the tablets are charged by the operator, in which case the operator comes into contact with the calcium hypochlorite.

SUMMARY

In contrast, according to various embodiments, a container and also a device and a method for generating a chlorine-containing aqueous disinfectant solution can be provided, in which, in contrast to conventional solutions, safe operation is made possible with minimum complexity in terms of the device.

According to an embodiment, a container may have a charge which contains at least one hypochlorite compound, in particular one calcium hypochlorite compound, for generating a chlorine-containing, aqueous solution, and may have at least one inlet attachment for attachment to a water supply line and at least one outlet attachment for attachment to an outlet line for a liquid formed from inflowing water and the charge, wherein the charge is situated in terms of flow between the inlet attachment and the outlet attachment, characterized in that the container is constructed as a transportable exchangeable unit sealed off from the outside in the non-attached state.

According to a further embodiment, the inlet attachment and the outlet attachment can be provided with locking appliances which seal in the non-attached state, in particular self-locking attachment couplings, which are unlatchable for or during attachment. According to a further embodiment, the container can be constructed so as to be refillable.

According to a further embodiment, at least one unsealable and resealable refilling opening can be provided. According to a further embodiment, the container can be disposed for an operating position such that the flow passes through the charge at least substantially from bottom to top. According to a further embodiment, this container can be constructed in such a manner that the sedimentation velocity of insoluble components of the charge and/or reaction products is higher than the through-flow velocity. According to a further embodiment, the container can be disposed for retaining and receiving dissolution residues and/or reaction products remaining on formation of the aqueous solution. According to a further embodiment, this container can be formed as a longitudinally extended cartridge and the charge is layered, as a standing column, over the entire diameter through which flow passes. According to a further embodiment, at least one feed line can be provided which passes through the charge and opens out in the region of a bottom section of the container. According to a further embodiment, the feed line may extend at least in sections along and/or in parallel to a longitudinal axis of the container. According to a further embodiment, at least one distributor for the water can be provided, which distributor is arranged downstream of the inlet attachment in terms of flow and upstream of the charge in terms of flow. According to a further embodiment, the distributor can be arranged on a bottom-side line end of the feed line. According to a further embodiment, the charge can be a bulk material containing the hypochlorite compound and mixed with insoluble packing elements. According to a further embodiment, the container may further comprise at least one flow retarder, in particular a fine-grained bulk material layer, following the inlet attachment and arranged upstream of the charge in terms of flow. According to a further embodiment, the container may further comprise at least one flow retarder, in particular a fine-grained bulk material layer, following the charge and arranged upstream of the outlet attachment in terms of flow. According to a further embodiment, the container may further comprise an unfilled sedimentation section arranged downstream of the charge and upstream of the outlet attachment in terms of flow. According to a further embodiment, the container may further comprise at least one filter means for retaining insoluble components of the charge, in particular a filter element arranged directly upstream of the outlet attachment in terms of flow. According to a further embodiment, the water inlet and/or water outlet can be throttled to a desired through-flow rate. According to a further embodiment, this container can be pressure-tight under conventional water line pressures, in particular is pressure-tight up to 16 bar. According to a further embodiment, the container may comprise a recording appliance, preferably a transmitter, for measuring the charge level.

According to another embodiment, a device for generating a chlorine-containing, aqueous disinfectant solution, may comprise at least one container as described above.

According to a further embodiment of the device, the device may further comprise an installation appliance in which the container is received in such a manner that the water stream passes through the charge at least in sections from bottom to top. According to a further embodiment of the device, the installation appliance may comprise non-confusable attachments for the container. According to a further embodiment of the device, the container can be arranged between a dissolution water apparatus provided upstream of the container and an inoculation water apparatus provided downstream which comprises at least one inoculation site for adding a disinfectant solution to service water or drinking water. According to a further embodiment of the device, the dissolution water apparatus may comprise at least one metering pump, connected to a dissolution water source, for feeding dissolution water to the container. According to a further embodiment of the device, at least one nonreturn valve blocking in the direction of the dissolution water apparatus can be arranged between the container and the dissolution water apparatus. According to a further embodiment of the device, a relief valve connected to a pressure sink can be provided between the container and the at least one inoculation site. According to a further embodiment of the device, at least one solution container for temporary storage of the chlorine-containing, aqueous disinfectant solution can be provided between the container and the at least one inoculation site.

According to yet another embodiment, a method for generating a chlorine-containing, aqueous disinfectant solution and treating an aqueous system, may comprise: a) inserting at least one container into an installation appliance, wherein the container comprises a charge having a hypochlorite compound, preferably a calcium hypochlorite compound, and is constructed as a transportable exchangeable unit that is sealed off from the outside in the state not attached to the installation appliance; b) admixing the charge with a dissolution water stream for generating the disinfectant solution; c) introducing the disinfectant solution into the aqueous system that is to be treated.

According to a further embodiment of the method, the dissolution residues and/or reaction products remaining on formation of the chlorine-containing, aqueous disinfectant solution can substantially be received by the container. According to a further embodiment of the method, the container, after it is emptied, can be taken out of the installation appliance and fed to a recycling system. According to a further embodiment of the method, the charge level of the container can be monitored.

BRIEF DESCRIPTION OF THE DRAWINGS

Hereinafter, exemplary embodiments are described in more detail with reference to diagrammatic drawings. In the drawings.

DETAILED DESCRIPTION

As is the case with the known solution containers, the container according to various embodiments is provided with a hypochlorite-containing charge for generating an aqueous solution, that is to say a charge which contains at least one hypochlorite compound, preferably calcium hypochlorite, for example in the form of calcium hypochlorite granules, and has at least one inlet attachment for attachment to a water supply line and at least one outlet attachment for attachment to an outlet line for a liquid formed from water flowing in from the water supply line and the charge, wherein the charge is situated in terms of flow between the inlet attachment and the outlet attachment.

According to various embodiments the container is now constructed as a transportable exchangeable unit sealed off from the outside in the non-attached state. The charge which is preferably formed as a calcium hypochlorite bed or containing such a bed is received in the solution according to various embodiments in the exchangeable container sealed from the outside, and so the user cannot come into contact with the hypochlorite compound which is hazardous to health. The container preferably serves as transport packaging for the calcium hypochlorite charge.

Charging the container on site by the operator and therefore contact between the operator and the hypochlorite is prevented. This is achieved by sealing the container which denies the operator access to the charge. Known closures which an operator can open and reclose independently without the aid of tools and/or non-destructively have been dispensed with.

It has proved to be particularly advantageous if the container is constructed in such a manner that the dissolution residues and/or reaction products remaining on formation of the aqueous solution are essentially received in the container and are not washed away. The solution residues occurring, in particular sludge from lime and insoluble components of the calcium hypochlorite charge do not then pass into the water stream that is to be disinfected. The container therefore makes it possible to provide a calcium hypochlorite solution which is substantially free from particulate residues, and so the solution can be used without hazard for the subsequent metering appliances. Contamination of inoculation water apparatuses arranged downstream of the container is thereby prevented. Owing to the dissolution residues remaining in the exchangeable container, contact by the user with the residues is likewise excluded. The container can then also serve as disposal packaging for the dissolution residues.

After exhaustion of the charge in the container, this container can be constructed in such a manner that refilling is generally not possible. This is the case, for example, if the container was welded or glued, and so destruction thereof occurs on opening the container.

However, the container, in an exemplary embodiment, is constructed so as to be refillable. For this purpose the container can be provided with at least one unsealable and resealable refilling opening. The container arrives in the sealed state at the user who can neither open nor refill it. An exhausted container (dissolution reaction completed) can be exchanged for a filled container. The emptied container together with the dissolution residues formed during the reaction can be supplied to the manufacturer for correct disposal of the residues and recycling of the container. Correct disposal of the residues by qualified personnel using appropriate safety equipment and facilities for safe operations is thereby ensured.

A freshly filled container which may be opened by the manufacturer of the container for the purposes of refilling, but not by the operator, may be provided with a seal for example via a lead seal, leaded strap, seal mark, seal label or the like. The operator recognizes without difficulty on the basis of such measures that he is not able to open the container.

According to an exemplary embodiment of the container, the inlet attachment and the outlet attachment are provided with locking appliances which seal in the non-attached state, in particular self-locking attachment couplings, which are unlatchable for or during attachment. The container, and in particular the attachments of the container, are preferably constructed in such a manner that they may only be opened on attachment to the metering device. The withdrawal of subquantities from the container is preferably prevented. In addition, the attachment couplings prevent the escape of calcium hypochlorite granules from a filled container and of solution residues from an exhausted container. The container is thereby simple and safe to exchange as soon as the calcium hypochlorite charge received therein has been consumed for disinfection. The attachment couplings are preferably constructed so as to be non-confusable, in order to prevent user errors on installation of the container into the metering device. The calcium hypochlorite-containing charge is transported and stored in the closed and sealed container, and so no calcium hypochlorite-containing dust and/or calcium hypochlorite granules can escape. Mistaken contact of combustible materials such as, for example, oil or fat, with the calcium hypochlorite charge is substantially excluded by the sealed attachments and the sealing of the container. The attachments of the container can preferably only be opened by the fitting attachments of an installation appliance of the metering device in order to exclude user errors.

Owing to the closable and/or sealable construction of the container, it is storable over a long time without loss of quality and can be brought into a usable state within a very short time.

The container is preferably constructed in such a manner that the charge is substantially protected against the action of light. Unclosed partially emptied storage containers for dry calcium hypochlorite granules, as are required in methods according to the prior art can thereby be excluded.

The container, in one exemplary embodiment, is formed as a longitudinally extended cartridge, wherein the charge is layered, as a standing column, over the entire diameter through which flow passes in use according to specifications. The cartridge, according to an exemplary embodiment, has a roughly cylindrical housing which makes possible throughflow without dead water zones, in such a manner that a uniform dissolution reaction is achieved. The flow-through velocity can be influenced by the dimensioning of the cross-sectional area of the cartridge. The less turbulent the flow in the cartridge is, the better is the prevention of discharge of dissolution residues from the cartridge.

As installed position of the cartridge, it is preferred when a longitudinal axis of the cartridge is arranged vertically.

The outlet attachment is preferably arranged on the top side or at the top end of the container or of the cartridge. Gases formed during the calcium hypochlorite dissolution reaction can thereby escape from the container or the cartridge, without adversely affecting the calcium hypochlorite solution flow.

The container or the cartridge are dimensioned, in particular, in such a manner that it is possible to install them into the water supply line directly under conventional water line pressures, for example up to a system pressure of about 16 bar, by means of an installation appliance. On direct installation of the container or the cartridge into the water supply line, the technical facilities for conveying and providing the dissolution water stream are arranged in the direction of flow preferably upstream of the container or the cartridge. The penetration of any undissolved particles occurring in the case of a fault into these facilities and the impairment of function to be feared as a consequence can thus be prevented, for which, for the sake of safety, suitable nonreturn valves can be provided.

The container or the cartridge are preferably installed for an operating position in which the water stream flows through the calcium hypochlorite charge at least substantially from bottom to top. Insoluble components of the calcium hypochlorite charge can then settle by sedimentation under the effect of gravity. The sedimentation proceeds in a controlled manner, owing to the addition of dissolution water from the bottom, in such a manner that, in contrast to an introduction at the side, turbulent flow is prevented. Preferably, the flow passes through the calcium hypochlorite charge essentially vertically from bottom to top, i.e. against gravity.

The sedimentation velocity of insoluble components of the calcium hypochlorite charge and/or reaction products is preferably higher than the flow velocity through the cartridge. Preferably, the cartridge is dimensioned such that the particulate residues inevitably occurring during the dissolution reaction remain in the container owing to sedimentation, optionally supported by filtration, and do not arrive in the water stream that is to be disinfected. In contrast to the dissolution container method, no sedimentation times are required. Compared with the mixer method, no hydrochloric acid needs to be added in order to dissolve particulate residues in the calcium hypochlorite solution to be metered.

In a particularly compact embodiment of the container or the cartridge, in the interior thereof, a feed line passing through the calcium hypochlorite charge for the dissolution water feed is arranged, the free end section of which feed line opens out in the region of a bottom section of the cartridge. Preferably, the feed line extends at least in sections along or in parallel to a longitudinal axis of the container, in particular the cartridge. Alternatively, the dissolution water can be fed via a feed opening in the region of the bottom of the container, in particular the cartridge.

For improving the dissolution water distribution, advantageously a distributor arranged downstream of the inlet attachment in terms of flow and arranged upstream of the charge in terms of flow is advantageously provided for the water. The distributor can, for example, be constructed as a gap filter and be arranged on the bottom side in the container or the cartridge, for example on the bottom-side line end of the feed line.

It has proved to be particularly advantageous if a flow retarder following the inlet attachment and arranged upstream of the charge in terms of flow, is provided in the container or the cartridge. The flow retarder arranged at the bottom of the container or the cartridge serves, in particular, for the additional distribution of the dissolution water and as a supporting layer for the calcium hypochlorite charge introduced thereabove (calcium hypochlorite bed). The flow retarder is preferably introduced as a fine-grained bulk material layer in such a manner into the container or the cartridge that the open line end of the feed line opens out within the layer. Furthermore, additionally or alternatively packing elements and/or textile-like materials can be used as flow retarder. A fine-mesh wire sieve, a felt, sponge or porous sintered material would likewise be conceivable as replacement for a fine-grained bulk material layer.

To the hypochlorite charge, in particular the calcium hypochlorite charge, are added preferably chemically resistant packing elements. Packing elements which can be used are, for example, plastic bodies such as PVDF rings (polyvinylidene fluoride rings). The packing elements prevent unwanted solidification (clumping) of the calcium hypochlorite charge even in the event of relatively long storage times of the container or the cartridge.

The container, in particular the cartridge, preferably additionally has a flow retarder following the charge and arranged upstream of the outlet attachment in terms of flow. These can be applied, for example, as fine-grained bulk material layer, in particular sand bed, to the upper side of the hypochlorite charge, in particular calcium hypochlorite charge, in such a manner that the charge is arranged between the flow retarders. The flow retarder following the charge also serves as a filter layer and reduces insoluble components and dissolution products (lime etc) from being washed away from the charge. The fraction of solid particles to be sedimented is minimized thereby. Furthermore, additionally or alternatively, packing elements and/or textile-like materials can be used as filters. A fine-mesh wire sieve, a felt, sponge or a porous sintered material would be conceivable as filter layer.

The outlet attachment of the container or the cartridge is preferably arranged axially at a distance above the charge, in particular the calcium hypochlorite charge, and/or the optionally provided flow retarder. An unfilled or free sedimentation section arranged downstream of the charge and upstream of the outlet attachment in terms of flow is thereby formed between the charge and the outlet attachment of the cartridge. In the sedimentation section, particles can sediment off which could pass through the flow retarder.

In addition, filter means for retaining insoluble components of the charge can be provided, in particular a filter element arranged directly or indirectly upstream of the outlet attachment in terms of flow.

In a device according to various embodiments for generating a chlorine-containing, aqueous disinfectant solution, at least containers according to various embodiments, in particular a calcium hypochlorite-filled cartridge, is used. The device is, in particular, a metering appliance for generating and metering the chlorine-containing, aqueous disinfectant solution.

According to an exemplary embodiment, an installation appliance is provided in which the container or the cartridge is received in the correct position in which the water stream flows through the charge, in particular the calcium hypochlorite charge, at least in sections from bottom to top. The installation appliance preferably comprises non-confusable attachments for the container or the cartridge in order to avoid user errors.

In an embodiment of the device, the container or the cartridge is arranged between a dissolution water apparatus provided upstream of the container or the cartridge and an inoculation water apparatus provided downstream of the container or the cartridge, wherein the inoculation water apparatus comprises at least one inoculation site for adding a disinfectant solution into service water or drinking water (inoculation water feed). The water inlet and/or water outlet of the container or the cartridge can preferably be throttled to a desired through-flow rate. Between the inoculation site and the container or the cartridge, a locking appliance, in particular a shut-off cock (ball cock), can be arranged for shutting off the inoculation site.

The dissolution water apparatus can, for example, for drinking water, bathing pool or process water disinfection, be connected to the drinking water grid. The dissolution water pressure, on connection to the drinking water grid, is preferably determined by a pressure-limiting valve. By means of a flow throttle, the maximum possible dissolution water stream can be limited.

In a metering device suitable, in particular, for swimming pool water disinfection, at least one metering pump connected to a dissolution water source via a pump line for feeding dissolution water into the container or the cartridge is provided. The at least one metering pump is controlled, in particular, via a chlorine excess controller and/or a controller as described in DE 198 44 179 B4, depending on the current water quality at the inoculation site.

It has proved to be particularly advantageous in terms of the device if at least one nonreturn valve closing in the direction of the dissolution water apparatus is arranged between the cartridge and the dissolution water apparatus. The nonreturn valve prevents backflow or backdiffusion of calcium hypochlorite solution from the container or the cartridge into the dissolution water apparatus.

Between the container, in particular the cartridge, and the at least one inoculation site of the inoculation water apparatus, there can be provided a relief valve, for example a 3-way ball cock, connected to a pressure sink, for reducing the system pressure of the cartridge.

The inoculation site and/or the dissolution water takeoff site can be shut off using closing valves (ball cocks). Unpressurized exchange of the exhausted container or of the exhausted cartridge is possible thereby.

According to an alternative exemplary embodiment of the metering device, at least one solution container for temporary storage of the chlorine-containing, aqueous disinfectant solution is provided between the container or the cartridge and the at least one inoculation site.

Two or more containers or cartridges can be assigned in parallel to the device according to various embodiments. Manual or automatic switching between the containers and cartridges without interruption of the disinfectant process is possible thereby. The switching between the containers or cartridges can proceed, for example, by means of a solenoid valve arrangement.

According to a further embodiment, the hypochlorite filling level, in particular the calcium hypochlorite filling level is determined, preferably by means of a recording appliance. For example, the hypochlorite filling level is displayed by means of a container or cartridge which is constructed so as to be transparent at least in sections. The container or the cartridge can be furnished with a viewing window which comprises a minimum mark as a reference.

The filling level of the container or the cartridge in this solution is preferably determined visually, manually or automatically.

Alternatively or in addition, a capacity sensor for detecting the filling level, or a measuring appliance for measuring the conductivity of the hypochlorite solution leaving the cartridge, in particular calcium hypochlorite solution, can be assigned to the container or the cartridge. Such a system detects the difference in capacity between calcium hypochlorite charge and liquid or the deviations of the conductivity and uses these values for determining filling level.

In addition, the hypochlorite filling level, in particular the calcium hypochlorite filling level, can be determined by means of a transmitter element (level detection). The transmitter element, for example a sinker having a magnetic core, can be placed on the filter layer (sand bed) within the cartridge and can be detected from the outside by means of a sensor (for example a reed contact) for determining the fill height.

The starting chlorine concentration at the outlet attachment is used in one exemplary embodiment for determining the filling level of the charge, in particular calcium hypochlorite charge. When the charge, in particular the calcium hypochlorite, is virtually completely dissolved, the starting chlorine concentration of the container/the cartridge falls. In order to keep the chlorine value in the water stream that is to be disinfected, at the end of the standing time of the container/the cartridge, more must be added. What is termed the Y-out value, i.e. the variable, increases, and can, with corresponding evaluation, be used as indicator of an empty container or an empty cartridge.

According to an alternative exemplary embodiment, the remaining fill amount of charge, in particular the calcium hypochlorite fill amount, of the container/of the cartridge is determined via the volume of dissolution water taken off, preferably using an oval wheel meter. Depending on the original fill amount, this gives a maximum possible takeoff amount, from which the current fill level can be concluded.

A balance arrangement can likewise be used for determining the weight of the container/the cartridge and thereby for determining the fill amount of the charge, in particular the calcium hypochlorite charge. By means of the balance, the current weight of the container/cartridge is determined and thereby the remaining fill amount calculated.

The timepoint for exchange of the container/cartridge is indicated to the user preferably visually and/or acoustically. In a method according to various embodiments for treating an aqueous system with a chlorine-containing, aqueous disinfectant solution, the container according to various embodiments, in particular the calcium hypochlorite-filled cartridge, is inserted into an installation appliance. The charge, in particular the calcium hypochlorite charge, is then admixed with a dissolution water stream for generating the chlorine-containing, aqueous disinfectant solution and the disinfectant solution is introduced into the aqueous system that is to be treated.

The dissolution residues and/or reaction products remaining on formation of the disinfectant solution are preferably substantially received by the container/the cartridge.

It has proved to be particularly advantageous if the container/the cartridge, after being emptied, is removed from the device and fed to a recycling system. In particular, an exhausted container or an exhausted cartridge is returned to the manufacturer who disposes in a safe and proper manner of the residue contained therein. Compared with the prior art, the insoluble, chlorine-containing residues are not dumped on site into the sewer system, but are supplied to correct disposal on the part of the manufacturer or recycler. The container or the cartridge is there cleaned after it is emptied, dried, tested, refilled with solid hypochlorite, in particular calcium hypochlorite granules, closed and sealed. Dry calcium hypochlorite granules recharged into the container/cartridge have a virtually unrestricted storage life in the closed and/or sealed cartridge and are usable at short notice. Therefore, the container/cartridge is also suitable for stand-by and/or emergency disinfectant tasks.

Figure 1:
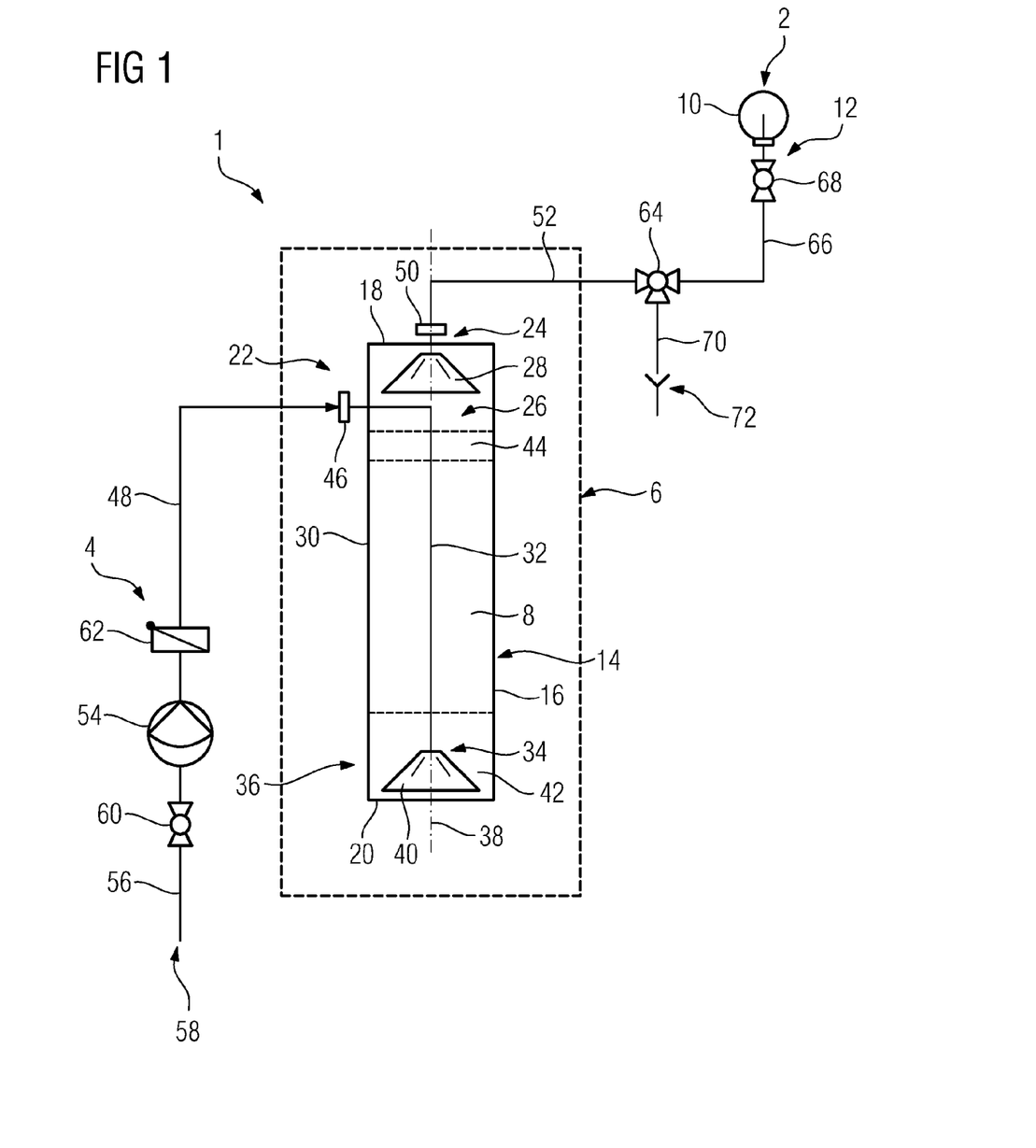
FIG. 1 shows a connection diagram of an exemplary example of a metering device having a container with calcium hypochlorite charge.

With reference to FIG. 1, first a first exemplary embodiment of a device constructed as metering device 1 is described, which is used, for example, for disinfection of swimming pool water.

FIG. 1 shows a connection diagram of a metering device 1 for metering calcium hypochlorite into an aqueous system 2, for example into a swimming pool. The metering device 1 uses a dissolution water apparatus 4 for providing dissolution water for a container 14. The container 14 is arranged in an installation appliance 6 and comprises a calcium hypochlorite charge 8 which can be admixed with a dissolution water stream, forming a calcium hypochlorite solution. The calcium hypochlorite solution can be metered into the aqueous system 2 that is to be treated by means of an inoculation site 10 of an inoculation water apparatus 12. The calcium hypochlorite container 14 is constructed as a transportable exchangeable unit sealed from the outside in the unattached state, in such a manner that the user cannot come into contact with the calcium hypochlorite which is hazardous to health.

In the exemplary embodiment shown, the calcium hypochlorite container 14 is constructed as a longitudinally extended cylindrical cartridge 16, wherein the calcium hypochlorite charge 8 is layered as a standing column over the entire diameter through which flow passes. At the end sections, the cartridge 16 is closed in each case via a closure cap 18, 20, wherein the lower closure cap 20 in FIG. 1 forms a base of the cartridge 16. The cartridge 16 is arranged between the dissolution water apparatus 4 provided upstream of the cartridge and also the inoculation water apparatus 12 provided downstream and has a dissolution water entrance 22 for the dissolution water stream and a solution exit 24 for the calcium hypochlorite solution. The dissolution water entrance 22 is arranged on an outer peripheral surface 30 of the cartridge 16 roughly at right angles to the solution exit 24 provided on the upper closure cap 18 of the cartridge 16. The solution exit 24 is connected to a filter means constructed as a gap filter 28 which is arranged in a sedimentation section 26 of the cartridge 16.

Within the cartridge 16 there is arranged a feed line 32 passing through the calcium hypochlorite charge 8, which feed line is connected to the dissolution water entry 22. An open end section 34 of the feed line 32 opens out in the region of a bottom section 36 of the cartridge 16 in such a manner that dissolution water can be fed from the bottom to the calcium hypochlorite charge 8 by means of the line 32. The feed line runs in sections along a longitudinal axis 38 of the cartridge 16, wherein, at the bottom-side line end 34 of the feed line 32, a distributor 40 for uniform distribution of the dissolution water is arranged. The distributor 40, in the exemplary embodiment shown, is constructed as a gap filter. In the region of the bottom-side line end 34 of the feed line 32, a flow retarder (distributor appliance) constructed as a sand bed 42 is introduced into the cartridge 16. The sand bed 42 serves, in particular, for the additional distribution of the dissolution water and as a support layer for the calcium hypochlorite charge 8 introduced thereabove.

The water stream from the dissolution water apparatus flows through the calcium hypochlorite charge 8 from bottom to top for forming the calcium hypochlorite solution. Insoluble components of the calcium hypochlorite charge 8 can settle thereby by sedimentation under the influence of gravity. In this case a relatively low velocity of flow through the cartridge 16 is advantageous. The calcium hypochlorite charge 8, in the exemplary embodiment shown, is introduced as dry granules into the cartridge 16, wherein chemically resistant packing elements in the form of PVDF rings are added to the calcium hypochlorite bed 8. The packing elements prevent unwanted solidification of the calcium hypochlorite charge, even in the event of relatively long storage times of the cartridge 16.

Between the calcium hypochlorite charge 8 and the solution exit 24, a flow retarder (filter layer) formed as a sand bed 44 is applied to the calcium hypochlorite charge 8, in such a manner that the charge is arranged between the sand layers 42, 44. The sand layer 44 reduces insoluble components and dissolution products from the calcium hypochlorite charge 8 from being washed away. Furthermore, packing elements and/or textile-like materials can be used as filters.

The dissolution water entry 22 is detachably connected to the dissolution water apparatus 4 via a self-locking inlet attachment 46 of the cartridge 16 and a dissolution water line 48. Correspondingly, the solution exit 24 is detachably connected to the inoculation water apparatus 12 by means of a self-locking outlet attachment 50 of the cartridge 16 and an outlet line 52. Inlet attachment 46 and outlet attachment 50 are constructed in a non-confusable manner, in order to exclude operating errors during installation and demounting of the cartridge 16. The dissolution water, during passage through the calcium hypochlorite bed 8, takes on a defined and relatively stable chlorine concentration and leaves the cartridge 16 via the gap filter 28 and the simply detached self-locking coupling 50.

In the exemplary embodiment shown, the dissolution water apparatus 4 for feeding dissolution water into the cartridge 16 comprises a metering pump 54, the entry attachment of which is connected via a pump line 56 to a dissolution water source 58. The metering pump 54 is controlled via a chlorine excess controller and/or a controller as described in DE 198 44 179 B4, depending on the current water quality at the inoculation site 10. The connection between the metering pump 54 and the dissolution water source 58 can be shut off by means of a closing valve constructed as a ball cock 60. Between the cartridge 16 and the metering pump 54, a nonreturn valve 62 closing in the direction of the metering pump 54 is arranged. The nonreturn valve 62 prevents backflow or backdiffusion of calcium hypochlorite solution into the metering pump 54. The inoculation water apparatus 12 has a relief valve constructed as a 3/3-way ball valve 64 (ball cock), the first attachment of which is connected via the outlet line 52 to the outlet attachment 50 of the cartridge 16. A second attachment of the 3/3-way ball valve 64 can be connected to the inoculation site 10 via an inoculation water line 66 and a closing valve 68 (ball cock) assigned to this. A third attachment of the 3/3-way ball valve 64 is connected to a sewer attachment 72 via a return line 70. In a working position of the ball valve 64, the outlet attachment 24 of the cartridge 16 is connected to the inoculation site 10, in such a manner that this inoculation site is supplied with calcium hypochlorite solution. The return attachment 70 is blocked. For changing the emptied cartridge 16, in a further working position of the ball valve 64, the connection of the cartridge 16 to the return line 70 via the outlet line 52 is opened, in such a manner that the pressure in the cartridge 16 is lowered. The cartridge 16 is then pressure-relieved and can then be changed. The connection between the inoculation site and the outlet attachment 24 is blocked. Unpressurized exchange of the exhausted cartridge 16 is thereby possible.

The calcium hypochlorite filling level is determined by means of a recording appliance with is not shown. The filling level display proceeds, for example, by means of a transparent construction of the cartridge 16. The filling level of the calcium hypochlorite charge 8 is determined visually manually in this solution. For this purpose a minimum mark, which is not shown, is provided on the cartridge 16.

Figure 2:
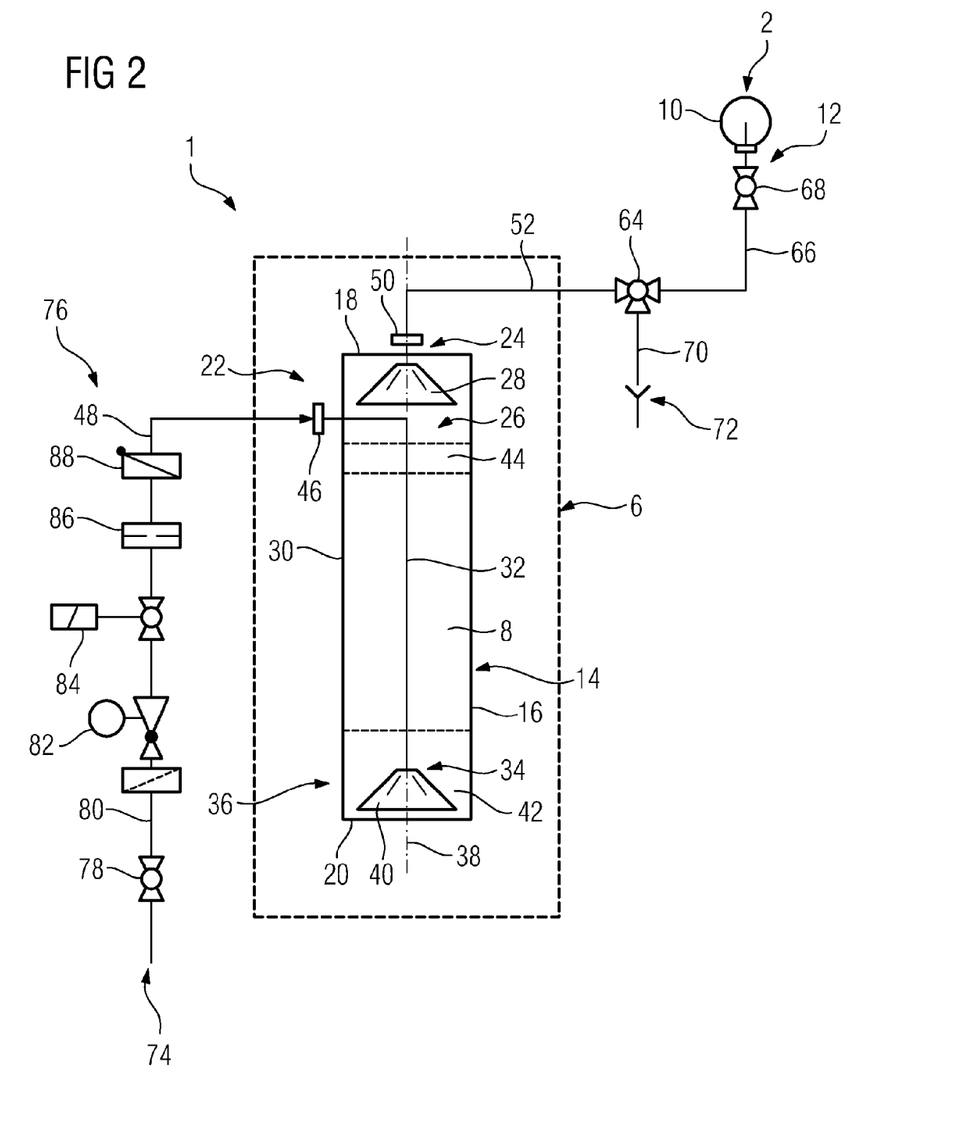
FIG. 2 shows a connection diagram of an exemplary embodiment of a metering device connected to the drinking water grid.

FIG. 2 shows an exemplary embodiment of a metering device 1 which is used, for example, for drinking water, swimming pool water or process water disinfection. This exemplary embodiment differs from the above-described exemplary embodiment essentially in a dissolution water apparatus 76 provided for attachment to a drinking water grid 74. Via a shut-off ball cock 78, the cartridge 16 is connected to a pressure line 80 of the drinking water grid, wherein a separating appliance (cf. pipe separator) which is not shown is provided. The dissolution water pressure is determined by a pressure-reducing valve 82. By means of the pressure-reducing valve 82, the maximum possible dissolution water pressure is limited. For controlling the dissolution water stream, a solenoid valve constructed as a continuously variable proportional valve 84 is provided downstream of the pressure-reducing valve 82. It is possible thereby to adapt the inoculation water stream of the metering device 1 to differing disinfectant requirements, in order to achieve optimum disinfectant action. Downstream of the proportional valve 84, a through-flow throttle 86 is provided. By means of the through-flow throttle 86, the maximum possible dissolution water stream is set. Between the cartridge 16 and the through-flow throttle 86, a nonreturn valve 88 blocking in the direction of the through-flow throttle 86 is arranged.

Figure 3:
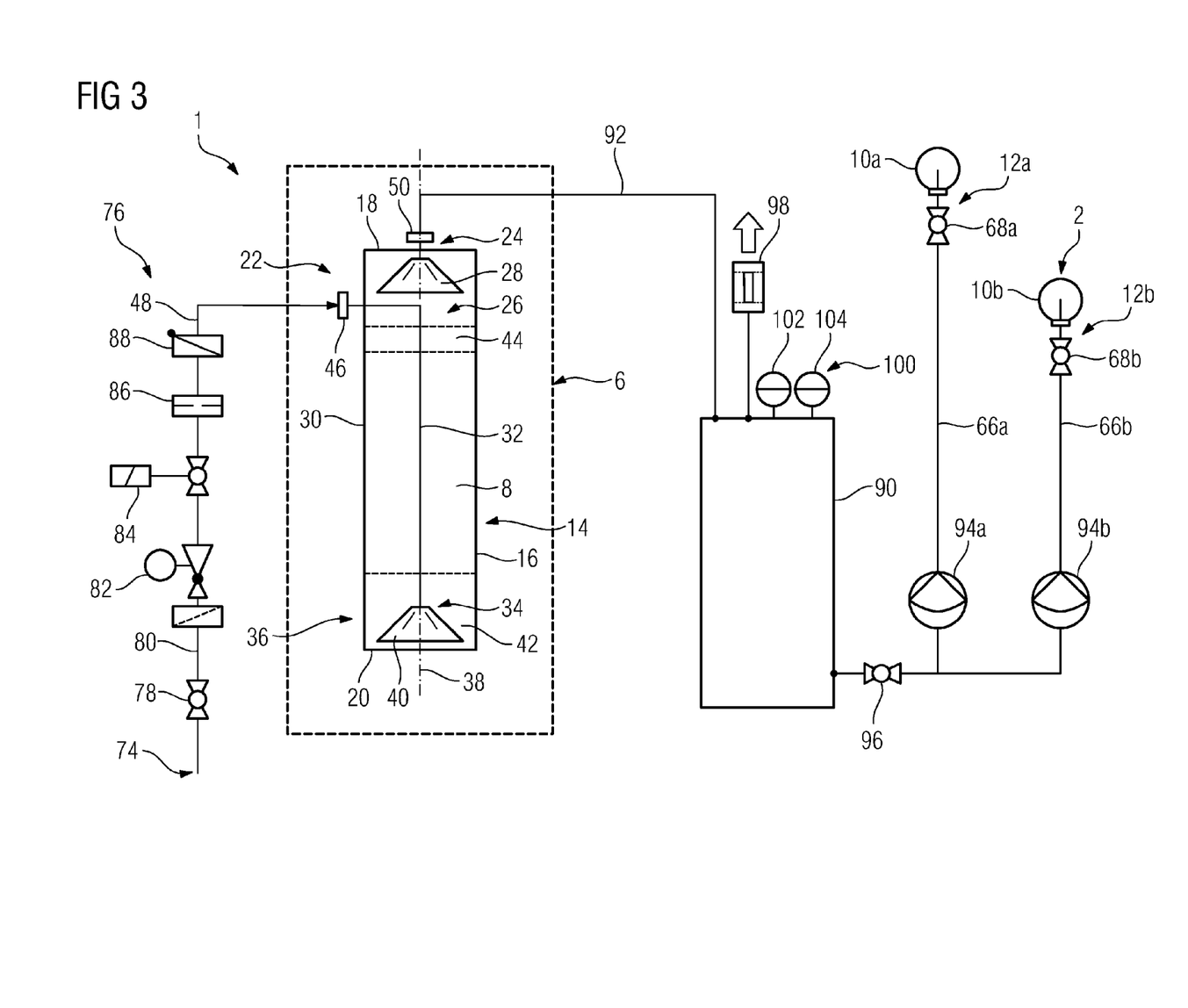
FIG. 3 shows a connection diagram of an exemplary embodiment of a metering device having a solution vessel and FIG. 4 shows a sequence diagram of an exemplary logistics chain of a container having calcium hypochlorite charge.

In an exemplary embodiment of a metering device 1 shown in FIG. 3, in contrast to the metering device shown in FIG. 2, between the cartridge 16 and two parallel inoculation sites 10a, 10b, a solution container 90 is provided for intermediate storage of the calcium hypochlorite solution. The solution exit 24 of the cartridge 16 is connected via an outlet line 92 to the top side of the solution container 90. The calcium hypochlorite solution is withdrawn from the solution container in this exemplary embodiment in each case by means of a metering pump 94a, 94b via a shut-off ball cock 96, fed to the assigned inoculation site 10a, 10b and metered into one or more water streams that are to be disinfected. The solution container 90 is vented (non-pressurized application) via a filter 98, for example an activated-carbon filter. The cartridge 16 is non-pressurized thereby and can be exchanged without hazard after it is emptied. The proportional valve 84 is opened in this solution via an exit signal of a level detection appliance 100 on the solution vessel 90. Depending on a minimum level 102 and a maximum level 104, the valve 84 is opened or closed and releases the dissolution water stream or interrupts it. In the solution container 90, the desired amount of calcium hypochlorite solution is thereby constantly available for disinfectant tasks.

Figure 4:
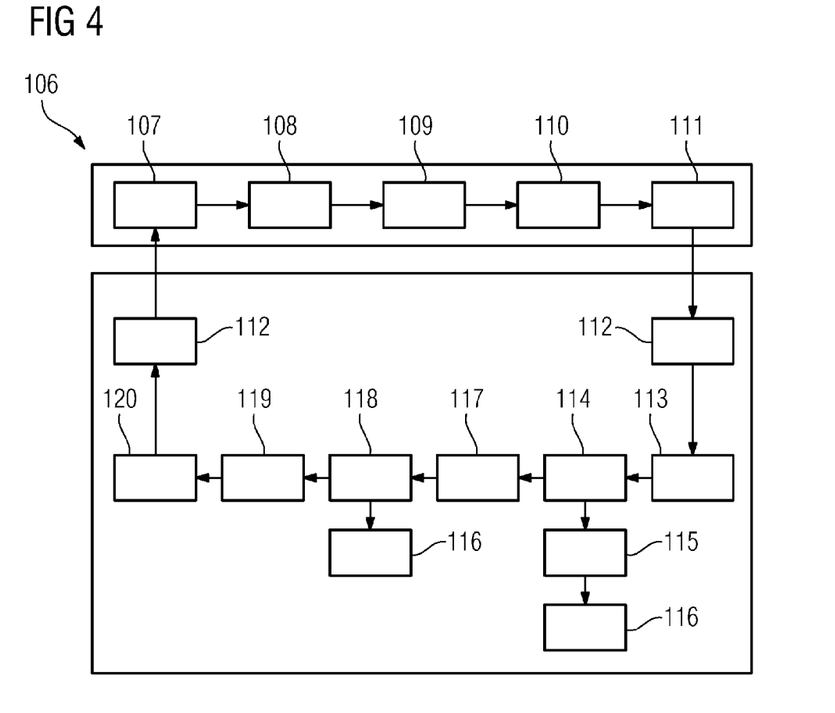

As may be seen in FIG. 4, which shows a sequence diagram of the logistics chain of a cartridge 16 according to various embodiments, this cartridge after use is fed to a recycling system 106.

For treating an aqueous system, the exchangeable cartridge 16 provided with a calcium hypochlorite charge is inserted into a metering device according to FIGS. 1 to 3 (step 108). The calcium hypochlorite charge 8 is then admixed with a dissolution water stream and the calcium hypochlorite solution formed is introduced into the aqueous system 2 that is to be treated, wherein the dissolution residues remaining on formation of the solution are substantially received within the cartridge 16 (step 109). The cartridge 16, after it is emptied, is removed from the metering device 1 (step 110) and passed on for recycling by the client (step 111).

The exhausted cartridge 16 is transported to the manufacturer/recycler (step 112) and subject to an entry examination (step 113). The cartridge 16 is then emptied (step 114). The dissolution residues are disposed of properly (step 115), likewise rejected cartridges 16 (step 116). The recyclable cartridges 16 are cleaned of dissolution residues and dried (step 117) and fed to an examination (step 118), wherein again non-recyclable cartridges 16 are disposed of (step 116). Reusable cartridges are refilled with calcium hypochlorite granules 8 and sealed (step 119) and stored by the manufacturer/recycler (step 120). The refilled cartridges 16 can then be transported to the client (step 112). The dry calcium hypochlorite granules 8 newly charged into the cartridge 16, in the closed and sealed cartridge 16, have a virtually unrestricted storage life with the client (step 107) and can be used at short notice.

The metering device 1 is not limited to the exemplary embodiments shown having only one cartridge 14, rather the metering device can comprise two or more cartridges 16 arranged in parallel.

A container 14 having a charge 8 is disclosed which charge comprises at least one hypochlorite compound, in particular a calcium hypochlorite compound, for generating an aqueous solution, and having at least one inlet attachment 46 for attachment to a water supply line 48 and at least one outlet attachment 50 for attachment to an outlet line 52, 92 for a liquid formed of inflowing water and the charge 8, wherein the charge 8 is situated between the inlet attachment 46 and the outlet attachment 50 in terms of flow, and the container 14 is constructed as a transportable exchangeable unit sealed from the outside in the non-attached state. In addition, a device for generating a chlorine-containing, aqueous disinfectant solution and also a method for generating such a disinfectant solution and treating an aqueous system are disclosed.

Although the invention has been described in more detail essentially for a container having a charge of calcium hypochlorite, it is obvious to those skilled in the art that, instead of calcium hypochlorite, other hypochlorite compounds present as a solid, such as, for example, potassium hypochlorite etc, and also mixtures of different hypochlorite compounds, are also usable as charge.

What is claimed is:

1. A container for generating a chlorine-containing, aqueous solution, comprising:
at least one inlet attachment for attachment to a water supply line and at least one outlet attachment for attachment to an outlet line for a liquid formed from inflowing water and a charge which contains at least one hypochlorite compound or one calcium hypochlorite compound, wherein the charge is situated in terms of flow between the inlet attachment and the outlet attachment, and wherein the container is constructed as a transportable exchangeable unit sealed off from the outside in the non-attached state;
wherein at least one feed line is provided which passes from the inlet attachment through the charge and opens in a region of a bottom section of the container, the outlet attachment situated at a region of a top section of the container.

2. The container according to claim 1, wherein the inlet attachment and the outlet attachment are provided with locking appliances which seal in the non-attached state or with self-locking attachment couplings, which are unlatchable for or during attachment.

3. The container according to claim 1, wherein the container is constructed so as to be refillable.

4. The container according to claim 3, wherein at least one unsealable and resealable refilling opening is provided.

5. The container according to claim 1, wherein the container is disposed for an operating position such that the flow passes through the charge at least substantially from bottom to top.

6. The container according to claim 1, wherein this container is constructed in such a manner that the sedimentation velocity of insoluble components of at least one of the charge and reaction products is higher than the through-flow velocity.

7. The container according to claim 1, wherein the container is disposed for retaining and receiving at least one of dissolution residues and reaction products remaining on formation of the aqueous solution.

8. The container according to claim 1, wherein the container is formed as a longitudinally extended cartridge and the charge is layered, as a standing column, over an entire diameter through which flow passes.

9. The container according to claim 1, wherein the feed line extends at least in sections at least one of along and in parallel to a longitudinal axis of the container.

10. The container according to claim 1, wherein at least one distributor for the water is provided, which distributor is arranged downstream of the inlet attachment in terms of flow and upstream of the charge in terms of flow.

11. The container according to claim 10, wherein the distributor is arranged on a bottom-side line end of the feed line.

12. The container according to claim 1, wherein the charge is a bulk material containing the hypochlorite compound and mixed with insoluble packing elements.

13. The container according to claim 1, comprising at least one flow retarder or a fine-grained bulk material layer, following the inlet attachment and arranged upstream of the charge in terms of flow.

14. The container according to claim 1, comprising at least one flow retarder or a fine-grained bulk material layer, following the charge and arranged upstream of the outlet attachment in terms of flow.

15. The container according to claim 1, comprising an unfilled sedimentation section arranged downstream of the charge and upstream of the outlet attachment in terms of flow.

16. The container according to claim 1, comprising at least one filter means for retaining insoluble components of the charge or a filter element arranged directly upstream of the outlet attachment in terms of flow.

17. The container according to claim 1, wherein at least one of the water inlet and water outlet can be throttled to a desired through-flow rate.

18. The container according to claim 1, wherein this container is pressure-tight under conventional water line pressures or is pressure-tight up to 16 bar.

19. The container according to claim 1, wherein the container comprises a recording appliance or a transmitter, for measuring the charge level.

\* \* \* \* \*